United States Patent
Collonville

(10) Patent No.: US 11,520,398 B2
(45) Date of Patent: Dec. 6, 2022

(54) PROCESSOR SYSTEM

(71) Applicant: NXP USA, Inc., Austin, TX (US)

(72) Inventor: Nicolas Collonville, Biot (FR)

(73) Assignee: NXP USA, Inc., Austin, TX (US)

(*) Notice: Subject to any disclaimer, the term of this patent is extended or adjusted under 35 U.S.C. 154(b) by 3 days.

(21) Appl. No.: 17/249,193

(22) Filed: Feb. 23, 2021

(65) Prior Publication Data

US 2021/0263846 A1    Aug. 26, 2021

(30) Foreign Application Priority Data

Feb. 25, 2020   (EP) .................................... 20305176

(51) Int. Cl.
*G06F 1/32*      (2019.01)
*G06F 1/3234*    (2019.01)

(52) U.S. Cl.
CPC .................................. *G06F 1/3275* (2013.01)

(58) Field of Classification Search
CPC .................................................... G06F 1/3275
See application file for complete search history.

(56) References Cited

U.S. PATENT DOCUMENTS

| | | | |
|---|---|---|---|
| 6,553,509 | B1 | 4/2003 | Hanson et al. |
| 7,657,290 | B2 | 2/2010 | Veselic et al. |
| 9,414,317 | B2 | 8/2016 | Shanmugasundaram et al. |
| 2010/0064159 | A1 | 3/2010 | Wu et al. |
| 2017/0003910 | A1* | 1/2017 | Brabender .............. G06F 12/06 |
| 2017/0045926 | A1* | 2/2017 | Powell ................... H01M 50/20 |
| 2019/0065293 | A1 | 2/2019 | Elsishans et al. |

FOREIGN PATENT DOCUMENTS

| | | |
|---|---|---|
| EP | 1351146 A1 | 10/2003 |
| KR | 100636527 B1 | 10/2006 |

OTHER PUBLICATIONS

Mackensen et al.: "Bluetooth Low Energy (BLE) based wireless sensors", SENSORS, 2012 IEEE, Oct. 28-31, 2012, Taipei, Taiwan, Taiwan, pp. 1-4.

Tang, Jun: "A Policy of Reducing Power Consumption for Bluetooth Devices", 2011 International Conference of Information Technology, Computer Engineering and Management Sciences, Sep. 24-25, 2011, Nanjing, Jiangsu, China, pp. 145-148.

* cited by examiner

*Primary Examiner* — Stefan Stoynov

(57) ABSTRACT

A processor system and method is described. The processor system includes a central processing unit (CPU) comprising a register for storing a stack pointer value, a non-volatile memory coupled to the CPU and having a first non-volatile memory region configured to store instructions executable by the CPU and a second non-volatile memory region configured to store a RAM-image comprising program context data. The processor system includes a random-access memory (RAM) coupled to the CPU and having a first RAM region and a second RAM region. The processor system is configured to have a first operating mode where the RAM data values are not retained and a second operating mode where the RAM is powered on. In operation, the processor system changes from the first operating mode to the second operating mode by applying power to the RAM, setting the stack pointer value to an address in the second RAM region, copying the program context data from the second non-volatile memory region to the first RAM region, and setting the stack pointer value to an address within a segment of the first RAM region.

20 Claims, 8 Drawing Sheets

PROCESSOR SYSTEM

CROSS-REFERENCE TO RELATED APPLICATIONS

This application claims the priority under 35 U.S.C. § 119 of European Patent application no. 20305176.8, filed on 25 Feb. 2020, the contents of which are incorporated by reference herein.

FIELD

This disclosure relates to a processor system and a method of operating a processor system.

BACKGROUND

A processor system may be included for example in a wireless Internet of Things (IoT) device or other low power or portable systems such as key fobs, sensors or other devices, some of which may be battery operated. These systems may be configured to change operating mode between a normal operation having a relatively short duration and an inactive state having relatively long duration. An inactive state may be for example when a RF transceiver of an IoT device or system is inactive, a wireless key fob is not being used, or an interval between a sensor operation which periodically measures temperature, pressure, current, voltage or other characteristics. During these periods of inactivity, the system may switch to a low power or standby mode where the power consumption is significantly reduced for example in order to preserve battery life.

In this standby mode, the processor system retains the contents of the volatile random-access memory (RAM) so that it can perform a fast transition to a normal operating mode. In the normal operating mode, the processor system may perform a required function such as for example to measure temperature, or pressure and then transmit the result, or to transmit and receive authentication information to unlock or lock a door. Once this task is completed, the processor system may then be in an idle-state where no further tasks need to be processed. At this point the processor system may power down to the standby mode once again to reduce power consumption.

SUMMARY

Various aspects of the disclosure are defined in the accompanying claims. In a first aspect there is provided processor system comprising: a central processing unit (CPU) comprising a register for storing a stack pointer value; a random-access memory (RAM) coupled to the CPU and having a first RAM region and a second RAM region; a non-volatile memory coupled to the CPU and having a first non-volatile memory region configured to store instructions executable by the CPU and a second non-volatile memory region configured to store a RAM-image comprising program context data; and wherein the processor system is configured to have a first operating mode where the RAM data values are not retained and a second operating mode where the RAM is powered on and is further configured to change from the first operating mode to the second operating mode by applying power to the RAM, setting the stack pointer value to an address in the second RAM region, copying the program context data from the second non-volatile memory region to the first RAM region, and setting the stack pointer value to an address within a segment of the first RAM region.

In one or more embodiments, in the first operating mode the RAM may be powered off or reset.

In one or more embodiments, the RAM-image may further comprise header data and footer data.

In one or more embodiments, the processor system may be further configured to copy the footer data to the first RAM region.

In one or more embodiments, the header data may comprise a magic value, a RAM-image size value, a RAM-image start address, and a checksum, and the footer data comprises an end of transfer flag.

In one or more embodiments, the processor system may further comprise a communication interface coupled to the CPU and wherein the RAM-image further comprises hardware configuration parameters comprising at least one of a CPU register value, a peripheral register value, and a communication parameter value.

In one or more embodiments, the hardware configuration parameters may be copied to the RAM before the program context data.

In one or more embodiments, the CPU may be configured to update the hardware peripherals and transceiver with the hardware configuration parameters while at least part of the program context data is being copied.

In one or more embodiments, the processor system may be further configured to set a stack pointer to an address in the second RAM region, and copy RAM-image data from the first RAM region to the second non-volatile memory region.

In one or more embodiments, the processor system may be further configured to generate the RAM-image by copying hardware configuration parameters comprising at least one of the CPU register values, and hardware peripheral register values to the first RAM region.

In one or more embodiments, the program context data may comprise a stack area and a heap area arranged towards opposite ends of the program context data and wherein in the second operating mode the stack and the heap are configured to increase in opposite directions.

In a second aspect, there is provided a method of changing from a first operating mode in which random access memory (RAM) data values are not retained to a second operating mode for a processor system comprising: a central processing unit (CPU) comprising a stack pointer register, a non-volatile memory coupled to the processor and having a first non-volatile memory region configured to store instructions executable by the CPU and a second non-volatile memory region configured to store a RAM-image comprising program context data, a RAM coupled to the CPU, the RAM having a first RAM region and a second RAM region, the method comprising: powering up the RAM, setting the stack pointer value to an address in the second RAM region as the stack, copying the RAM-image from the non-volatile memory second region to the first RAM region, and setting the stack pointer value to an address in a segment of the first RAM region.

In one or more embodiments, the RAM-image may comprise header data and footer data and the method may further comprise copying the footer data to the first RAM region.

In one or more embodiments, the RAM-image may further comprise hardware configuration parameters comprising at least one of a processor register value, a peripheral register value, and a transceiver parameter, and the method may further comprise copying the hardware configuration parameters to the RAM before the processor context data and updating the hardware peripheral registers and transceiver parameters with the hardware configuration parameters while at least part of the program context data is being copied.

In one or more embodiments, the method may further comprise: using the second RAM region as the stack, and copying the RAM-image from the first RAM region to the non-volatile memory second region.

In one or more embodiments, the method may further comprise changing from the second operating mode to the first operating mode after copying the RAM-image from the first RAM region to the non-volatile memory.

In one or more embodiments, the RAM-image may further comprise hardware configuration parameters comprising at least one of a CPU register value, a peripheral register value, and a communication parameter value and the method may further comprise copying the hardware configuration parameters to the RAM before the program context data and at least partially restoring the hardware configuration parameters while the program context data is being copied.

In one or more embodiments, the program context data comprises a stack area and a heap area arranged towards opposite ends of the program context data and wherein in the second operating mode the method comprises increasing the stack and the heap increase in opposite directions.

In a third aspect there is provided a computer program product for a processor system comprising a central processing unit (CPU) having a register for storing a stack pointer value; a random-access memory (RAM) coupled to the CPU and having a first RAM region and a second RAM region; a non-volatile memory coupled to the CPU and having a first non-volatile memory region configured to store the computer program product and a second non-volatile memory region configured to store a RAM-image comprising program context data; wherein the computer program product comprises instructions which, when being executed by the CPU, cause said CPU to perform the steps of changing the processor system from a first operating mode where a random access memory, RAM, data values are not retained to a second operating mode by powering up the RAM, setting the stack pointer value to an address in a second RAM region as the stack, copying the RAM-image from the second non-volatile memory region to the first RAM region, and setting the stack pointer value to an address in a segment of the first RAM region.

In one or more embodiments, the computer program product may further comprise instructions which cause the CPU to perform the steps of setting a stack pointer to an address in the second RAM region, and copying RAM-image data from the first RAM region to the second non-volatile memory region.

BRIEF DESCRIPTION OF THE DRAWINGS

In the figures and description like reference numerals refer to like features. Embodiments are now described in detail, by way of example only, illustrated by the accompanying drawings in which.

DETAILED DESCRIPTION

Figure 1:
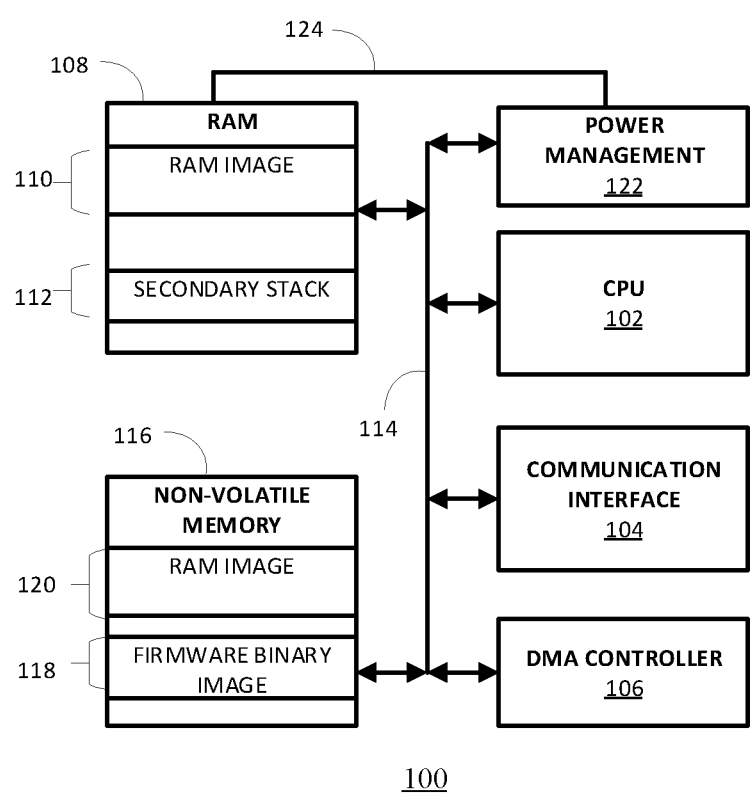
FIG. 1 Shows a processor system configured to transition between a first operating mode and a second operating mode according to an example embodiment.

FIG. 1 shows a processor system 100 configured to operate in a first mode and a second mode according to an embodiment. A processor system in the present disclosure may include any device or system which is configured to communicate with another device or system either via wired or wireless communication. The processor system 100 may be a single device including a central processing unit (CPU) 102 which may be a microprocessor or microcontroller. The CPU 102 may include a number of registers including a stack pointer register. The processor system 100 may further include a communication interface 104 which may be for example a wired or wireless transceiver for communication with other devices, a Direct Memory Access (DMA) controller 106, a random access memory (RAM) 108, and a non-volatile memory 116.

The processor system 100 may include a power management module 122 which may be controlled by the CPU 102 to power on or power off the RAM 108 by power control connection 124. The CPU 102, transceiver 104, DMA controller 106, RAM 108, non-volatile memory 116, and power management module 122 may be coupled together via a communication bus 114. In some examples the processor system 100 may be implemented on a single device for example a system-on-chip (SoC). In some examples the non-volatile memory 116 and/or the RAM 108 may be implemented on a separate device or separate devices.

The processor system 100 may also include other peripherals (not shown) which may be coupled to the communication bus 114. The DMA controller 106 and other peripherals may have interrupt connections (not shown) to the CPU 102. The term RAM as used in the present disclosure may refer to any volatile read-write memory which loses information when power is removed. The term non-volatile memory may refer to any read-write memory which retains information when power is removed, for example Flash memory. Memory addresses as referred to in the present disclosure may refer to physical addresses or virtual addresses.

The RAM 108 has a first region 110 which is configured to store a RAM-image. The RAM-image includes the data for the software stack used by the CPU. The RAM 108 has a second region 112 which may be configured as a secondary stack. The non-volatile memory 116 has a first non-volatile memory region 118 which may be used to store the software or firmware comprising a series of instructions which are executed in various modes of operation by the CPU 102. The non-volatile memory 116 has a second non-volatile memory region 120 in which the RAM-image may be stored.

In operation the processor system 100 may transition between a first operating mode and a second operating mode. The first operating mode may be for example a low-power state such as a power off state where either the device is completely powered down or a RAM-off state where the RAM 108 is powered off but other functions of the processor system 100 may still be powered on. In this first operating mode, the contents of the RAM 108 are no longer valid. The first operating mode may also be a reset state caused by a hardware or software reset operation where the data in the RAM is erased. A second operating mode may be a mode where the processor system 100 is in a normal operation state and all functions are enabled. The second operating mode may include an Idle state where the CPU 102 of the processor system 100 has completed all pending tasks. For embodiments of the processor system included in a wireless network node device, such as an Internet-of-Things (IoT) device, during normal operation the processor system 100 may for example record a sensor value such as temperature, pressure, humidity or other value via an appropriate sensor (not shown) and then transmit the sensor value via the communications interface 104. Once this is done the processor system 100 may then transition from the second operating mode back to a first operating mode to conserve power. For devices such as IoT devices or other battery-powered devices, it is important to minimise the power consumption especially when in an inactive state.

Figure 2A:
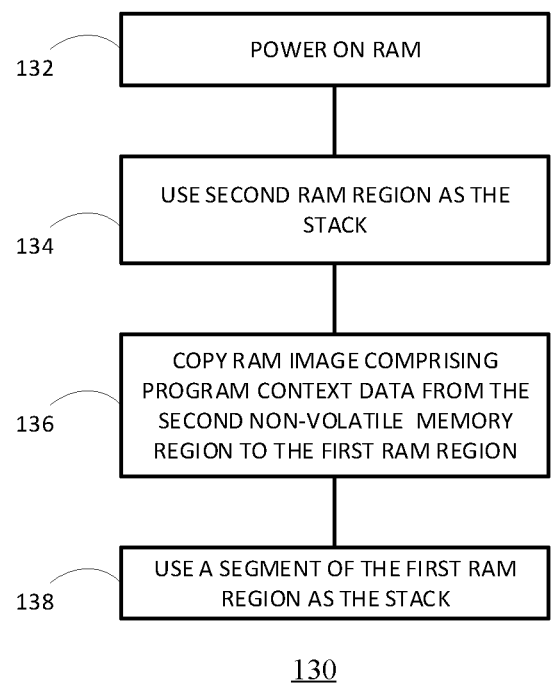
FIG. 2A illustrates a method of operation of the processor system of FIG. 1 to transitioning from a first operating mode to a second operating mode.

FIG. 2A illustrates a method of operation 130 of the network node device 100 illustrated FIG. 1 when transitioning from a first operating mode to a second operating mode. In step 132, the RAM 108 may be enabled. In step 134 the CPU 102 may use the second RAM region 112 as a secondary stack and so allocate the second RAM region 112 as the stack by for example changing the stack pointer to an address within the second RAM region 112. In step 136 the RAM-image which comprises program context data is copied from the second non-volatile memory region 120, to the first RAM region 110. The RAM-image contains the segments of data that is typically used by the CPU 102 and may include program context data including an initialized data section, a zero initialised section typically referred to as a bss section, a stack, and a heap. In some embodiments the stack sections may be located at lower memory addresses than the heap. The RAM-image may also include device specific hardware configuration parameters that may be included in a separate section.

In some examples, copying the RAM-Image from the second non-volatile memory region 120 to the first RAM region 110 may be done using a DMA transfer by means of the DMA controller 106 which is typically faster. In other examples, the CPU 102 may execute the memory transfer directly, in which case the DMA controller 106 may be omitted. Once the program context data has been transferred into the RAM second region 110, in step 138, the CPU 102 may start to reuse the stack in the RAM-image restored to the first RAM region by changing the stack pointer to an address of a segment in the first RAM region allocated as the stack. The RAM-image may contain the program context data that represents the state of the processor system 100. This processor system state may correspond to for example an idle state just before the processor system transitions into a first low-power operating mode. The RAM-image may contain a software stack captured when the processor system 100 is in the second operating mode. In addition the RAM-image may include the required configuration data such as hardware configuration register values, network parameter values, and the core register values for the CPU 102.

The inventor of the present disclosure has appreciated that for some processor systems, by saving the RAM-image into flash, typically only done once, and then subsequently restoring the RAM-image stored in the flash, the transition time between a first operating mode such as a standby or powered-down mode and a second normal operating mode can be reduced compared to a full start-up procedure. By avoiding a complete re-initialisation of the RAM, the power consumption may also be reduced during the system start up.

Due to the reduced transition time between the two operating modes, the inventor has further appreciated that in a low-power or standby mode a processor system 100 may completely power down the RAM 108 without compromising the performance. Since the RAM 108 may consume a significant amount of leakage current even in a standby mode of operation, the power consumption in the standby mode may be significantly reduced. Having a second RAM region 112 as a secondary stack used during the transition between operating states, may avoid the corruption of the stack information captured as part of the RAM-image.

In some embodiments, the RAM-image data which is generic to all devices may be written into the flash memory 116 during production and then used directly by the processor system 100.

In other examples, the processor system 100 may generate the required RAM-image following a full start-up procedure and just before the processor system 100 transitions from a normal operating mode to a standby operating mode.

Figure 2B:
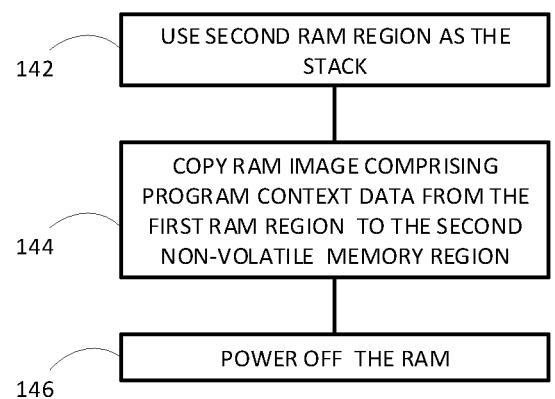
FIG. 2B illustrates a method of generating the RAM-image of the processor system of FIG. 1 before or during transitioning from a second operating mode to a first operating mode.

FIG. 2B shows a method 140 of generating a RAM-image. In step 142, the CPU 102 may use the second RAM region 112 as the secondary stack, for example by changing the stack pointer to an address within the second RAM region 112. Changing the stack pointer may preserve the state of the stack in the RAM-image of the first memory region 110. In step 144, the RAM-image comprising the program context data may be copied or transferred from the first RAM region 110 to the second non-volatile memory region 120. This transfer may be done either by the CPU 102 directly or by using the DMA controller 106 to perform a DMA transfer. Following the transfer of the program context data to the non-volatile memory 116, in step 146 the RAM is disabled or powered off and the processor system 100 may then enter the first operating state which may be a standby state.

The method 140 of generating the RAM context data may typically be used very infrequently, for example on first power up when in use within the network, or following an over the air or over the network software or firmware update, as this may result in a change of data in the RAM image. In some example embodiments, the method 140 may only be used once during the lifetime of the processor system 100.

Figure 3A:
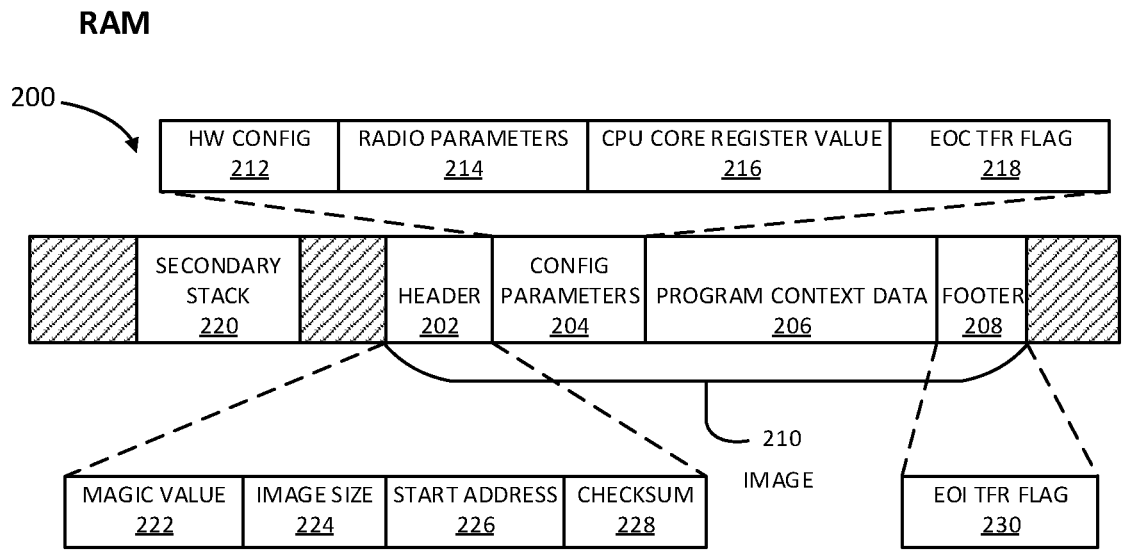
FIG. 3A shows an example embodiment of the RAM configuration of a processor system when a RAM-image is generated before or during a transition from a second operating mode to a first operating mode.

FIG. 3A shows an example embodiment of the configuration of a RAM 200 for a processor system when program context data is generated before or during a transition from a second operating mode to a first operating mode. As shown, the addresses of the RAM 200 may be considered to increase from left to right. The RAM 200 may include a first region including a RAM-image 210. The RAM-image 210 may include a header 202, configuration parameters 204, program context data 206 and a footer 208.

The header may consist of a magic value 222, a RAM image size value 224. The header 202 may also include a start address value 226, which indicates the start address in RAM at which the configuration parameters 204 are located or more generally the start location of where to copy the RAM-image from flash to RAM. In examples where only the program context data 206 is saved, the start address value 226 may indicate the start address of the program context data 206. The configuration parameters 204 may include hardware configuration parameters 212 for example hardware peripheral register values in the processor system. Optionally an end of configuration transfer flag 218 may be located at the end of the configuration parameters 204.

For wireless network node devices, the configuration parameters 204 may also include transceiver or communication interface parameters for example radio parameters such as radio physical, MAC and link layer parameters. The radio parameters may include trimming values for amplifiers which may be specific for each device following a calibration of a radio transceiver. The configuration parameters 204 may also include the CPU register values 216. The program context data 206 may include data representing the state of the software stack of the processor system in the second operating mode. The footer 208 includes an end of image transfer flag 230 which delimits the end of the RAM-image 210. The header 202 may be used to provide the RAM-image characteristics which are being restored and the footer 208 may be used during the restore process to determine that the program context data 206 and optionally that configuration parameters 204 are correctly restored. The physical RAM 200 also includes a second region including the secondary stack 220.

Figure 3B:
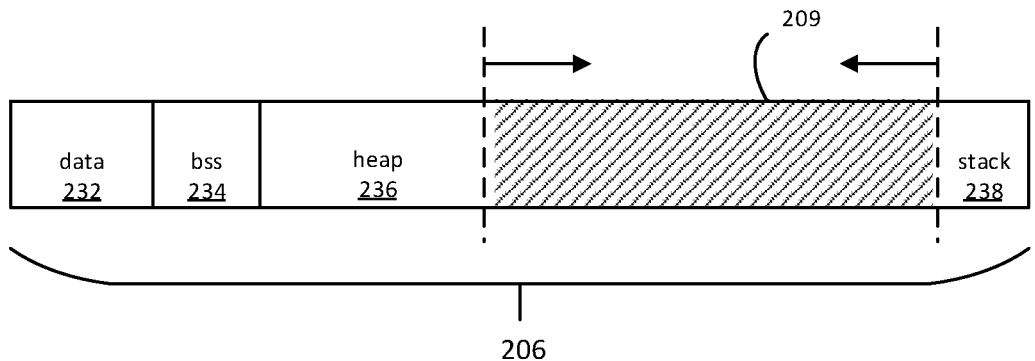
FIG. 3B shows a typical configuration of processor system program memory for holding context data.

FIG. 3B shows a typical configuration for program context data 206 which contains a number of sections or segments. These are, in order of increasing memory address range, a data segment 232 for any global or static variables having a predefined value, an uninitialized data segment 234 conventionally referred to as a bss segment, the heap area 236 and the stack area 238. The program code or text segment or section is located in the non-volatile memory so is not part of the context data as described herein. In normal operation the stack 238 fills in decreasing address order and the heap 236 fills in increasing address order. As shown in the traditional arrangement 206, the heap 236 and stack 238 fill the unused area of memory 209 towards each other, i.e. converge so that when the stack and heap pointers are at the same location there is no more available memory.

Figure 3C:
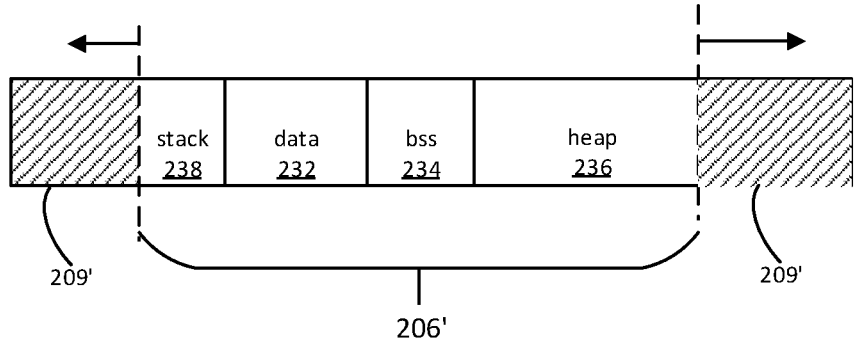
FIG. 3C shows a configuration of processor system program memory for holding program context data according to an embodiment.

FIG. 3C shows an alternative configuration for processor or program context data 206' which contains a number of sections or segments. These are, in order of increasing memory address range the stack 238, a data segment 232 for any global or static variables having a predefined value, the bss segment 234, and the heap area 236. In the arrangement of processor context data 206', in normal operation the heap 236 and stack 238 fill the unused areas of memory 208 away from each other, i.e. diverge. The inventor of the present disclosure has further appreciated that by organizing the program context data 206' in this way, when saving the RAM-image to flash, the RAM-image does not contain an unused region 209 of memory 200. Consequently, the size of the RAM-image which is saved is smaller which may reduce the time and power consumption required to save or restore a RAM-image to or from Flash memory.

Figure 3D:
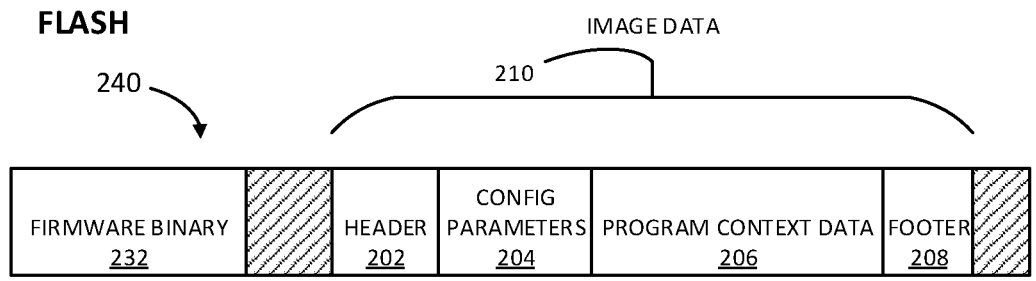
FIG. 3D shows an example embodiment of the Flash memory configuration of a processor system including a RAM image.

FIG. 3D shows an example embodiment of the configuration of Flash memory 240 of a processor system including a RAM image. Flash memory 240 includes a first region including a firmware binary 232 for execution by a processor for example the CPU 102 of network node device. RAM-image 210 is located in a second region of the Flash memory 240.

Figure 3E:
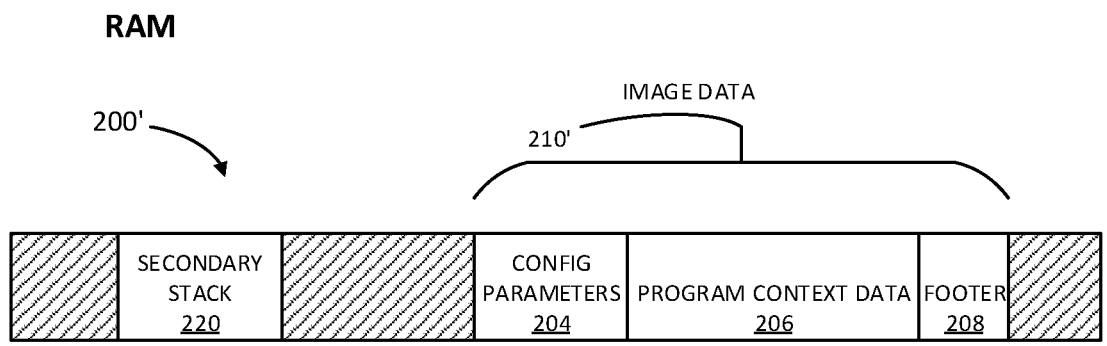
FIG. 3E shows an example embodiment of the RAM configuration of a processor system with RAM-image data restored from Flash during or after transitioning from a first operating mode to a second operating mode.

FIG. 3E shows an example embodiment of the RAM configuration 200' of a processor system after RAM context data restored from Flash 240 before or during a transition from a first operating mode to a second operating mode. The RAM 200' may include a first region including RAM-image 210'. The RAM-image 210' may include, configuration parameters 204, program context data 206 and a footer 208.

Figure 4:
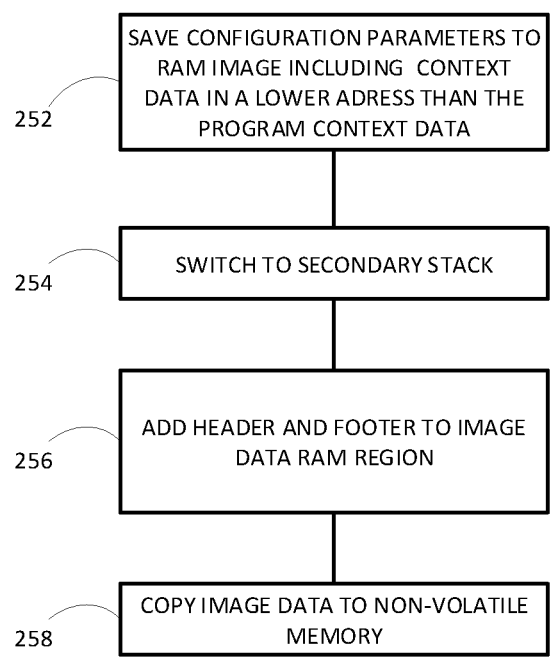
FIG. 4 shows a method of generating RAM-image data illustrated in FIG. 3A and saving the RAM-image data to Flash memory illustrated in FIG. 3D in a processor system according to an embodiment.

FIG. 4 shows a method of generating a RAM-image 250 in RAM and storing in Flash for a processor system according to an embodiment. The processor system may be in an operating mode whereby for example the software has configured the context of all the drivers, the hardware is fully configured, and the processor system has no other task pending but the setup for any future tasks has been completed. Example future tasks may include the expiration of any timers or for wireless networking any radio events.

In step 252, the values of the CPU core registers, the values of any hardware peripheral registers, and any radio link parameters may be saved to the configuration parameters field 204. The CPU core registers save and restore may be executed for example by calling "Setjump" and "Longjump" functions implemented in the C standard library.

In step 254, the processor may switch to use the secondary stack 220 by changing the location of the stack pointer. This operating mode may be for example an Idle state before a processor system saves the RAM-Image into flash. This prevents the corruption of the RAM-image saved to flash.

In step 256 a header 202 and a footer 208 may be added to the RAM region storing the RAM-image 210. In step 258 the RAM-image 210 in the RAM 200 may be copied to the flash memory 240. This copy step 258 may be done for example by the CPU 102 in the processor system 100. In other examples the copy step 258 may be done by DMA transfer using DMA controller 106.

In some examples, the method 250 may be implemented as part of the firmware binary 232 stored in Flash memory 240. In other examples the RAM-image 210 may be generated by a single device implementing the method 250. The resulting RAM-image may then be retrieved for example via a JTAG interface. This RAM-image may then be written into flash memory in copies of the processor system as part of the production process. The method 250 uses the secondary stack 220 to avoid corruption of the RAM-image 210 during copying.

Figure 5A:
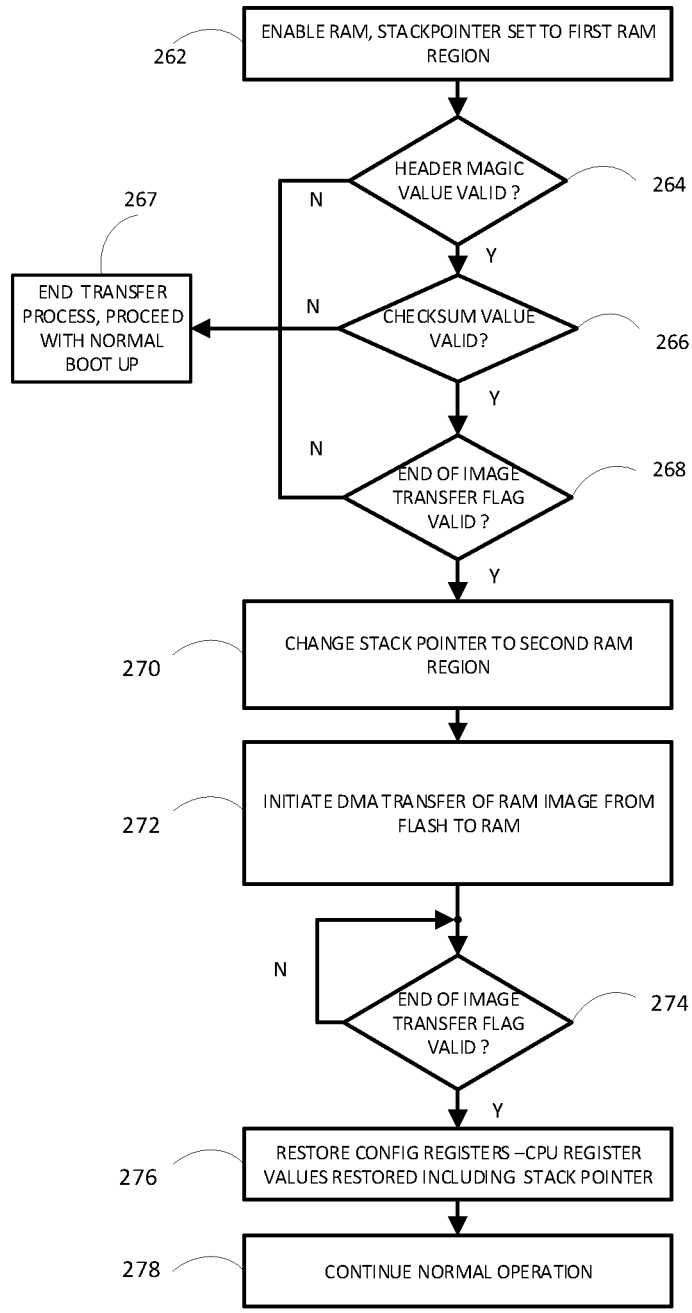
FIG. 5A shows a method of restoring RAM-image data from Flash memory as illustrated in FIG. 3D to RAM as illustrated in FIG. 3E in a processor system according to an embodiment.

FIG. 5A illustrates a method of restoring a RAM-image 260 for a processor system transitioning from a first operating mode to a second operating mode. This method 260 may be implemented for example on processor system 100.

A processor system may be in a first operating mode such as a low power standby state where the RAM is powered off. The first operating mode may also include a reset state where the RAM contents are erased. Following a start-up of the software or firmware 232, in step 262 the RAM 200 may be powered on, and the stack pointer may be set to an address in a first RAM region. A start up may result from for example a power reset, hardware reset, or wakeup from a low power mode with the RAM powered off.

In step 264 the header magic value 222 is checked. If this magic value 222 matches, then the method 260 proceeds to step 266 and the checksum 228 previously calculated based on the magic value 222, ram size 224 and ram start address 226 is checked. If the checksum 228 matches, the method proceeds to step 268 which checks whether the end of image transfer flag 230 of RAM-image footer 208 is valid and so verifies that all the data is transferred. The RAM-image footer 208 is at a location calculated from the ram_size 224. The checks in steps 264,266 and 268 may improve the robustness of the processor system if an invalid or incomplete RAM image is stored, for example when a power cut occurs during a RAM-image copy. An invalid RAM image which is not detected may result in the processor system not starting up correctly or at all. The checks in steps 264, 266, 268 may ensure the various fields in the RAM-image header 202 are valid and the full RAM-image 210 has been copied to flash. If any of the checks in steps 264, 266 and 268 do not match, the method proceeds to step 266 where the transfer process is ended and a normal full start-up sequence continues. If all the checks in steps 264, 266 and 268 are successful, the method proceeds to step 270 and the stack pointer is changed to a second RAM region corresponding to secondary stack 220 that will not be overwritten by the RAM-image data 210.

In step 272 the RAM image size 224 and start address 226 of the RAM-image 210 in RAM 200 may be read from the RAM-image header 202. A DMA transfer may be initiated from Flash 240 to RAM 200'. The DMA transfer of image data 210 does not need to copy the header 202 in flash 240 but the footer 208 may be required to confirm that the transfer is complete.

In step 274 a check may be made to determine when the transfer of RAM-image data 210' is complete. This check may be done by for example in processor system 100 by the CPU 102 polling a status register in the DMA 106 to determine completion. Alternatively the CPU 102 may execute a wait for interrupt instruction (WFI) and resume execution when the DMA controller 106 generates a transfer complete interrupt signal and the CPU 102 may monitor the transfer interrupt line from the DMA controller 106. Alternatively or in addition, the CPU 102 may check that the end of image transfer flag 230 is present at the expected footer location 208 in the RAM 200. At the beginning of the transfer the value at the footer location 208 in RAM 200 is empty and then once the transfer is complete, the value present at the footer location 208 should equal the end of image transfer flag 230. The end of image transfer flag 230 may be a predetermined value such as 0xDEADBEEF.

Once the transfer is complete, the method 260 proceeds to step 276 and the configuration parameters 204 are restored to the appropriate registers in the network node device by the CPU 102. The CPU register values 216 including the stack pointer value may be restored for example by implementing the Longjump function in the C standard library. Restoring the CPU registers values sets the stack pointer to the first memory region now containing the restored RAM-image 210

In step 278, the processor system may continue in the second operating mode. The processor system may then continue to operate by for example a processor unmasking interrupts, exiting an Idle task and then processing any upcoming events.

Figure 5B:
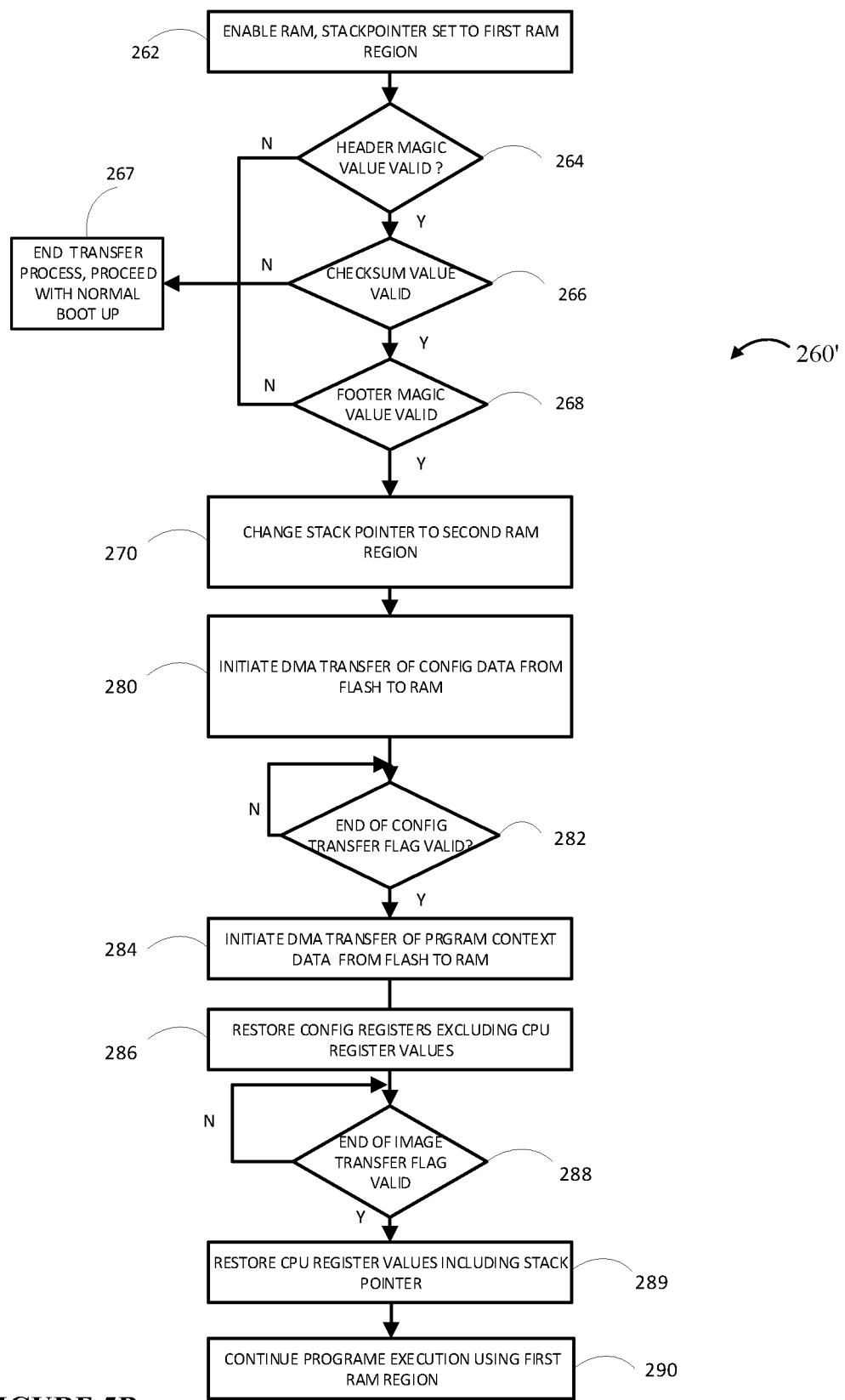
FIG. 5B shows an alternative method of restoring program context data from Flash memory to RAM in a processor system according to an embodiment.

The Hardware (HW) reconfiguration of configuration parameters 204 may take a significant amount of time which may affect the total restore time. FIG. 5B shows an alternative restore method 260' which may improve the overall restore time. Hardware configuration parameters 204 may optionally include an end of configuration transfer flag 218 for example to indicate that the hardware configuration should be processed as a separate dedicated section at the beginning of the RAM-image 210 before the RAM-image 206.

The initial steps 262,264,266,267, 268, 270 of method 260' are the same as described for method 260. Following step 270 at step 280 a DMA transfer started from Flash 240 to RAM 202' of the configuration parameters 204 is started.

In step 282 a check may be made to determine when the transfer of the configuration parameters 204 is complete, for example by checking the end of configuration transfer flag 218 has been copied to the RAM 200'. Once the transfer is complete, the method 260' proceeds to step 284 and initiates the DMA transfer of the program context data 206 from flash 240 to RAM 202'. In step 286 the configuration parameters 204 excluding the CPU register values may be restored to the appropriate registers in the processor system. In step 288 a check may be made to determine whether the transfer is complete for example by checking for the end of image transfer flag. Once the transfer of the RAM-image data 210 and the footer 208 is complete, the method may proceed to step 289 where the CPU register values 216 including the stack pointer register value may also be restored for example by calling the Longjump function in the C standard library. The stack pointer is consequently set to an address in the first memory region corresponding to a location of a stack in the processor context data 206, 206'. The processor system may continue in the second operating mode in step 290 by continuing program execution using the first RAM region. The processor system may then continue to operate by for example the CPU unmasking interrupts, exiting an Idle task and then processing the upcoming events in the restored stack.

In order to save the hardware parameters at the start of the RAM-image 210 in a first section, placement in the linker script may need to be done as well as including global variables used for the hardware restore mechanism. The end of configuration flag 218 may be placed at the end of this hardware configuration section 204 which can be checked to verify these parameters have been restored.

In other examples instead of starting a second DMA process for the program context data 206 which may take longer, a single DMA transfer may be started for the full RAM image 210' as for method 260, but instead the CPU waits for the end of configuration flag 218 to be set before applying the configuration parameters 204. Compared to the full device reinitialization, the duration of RAM restore method 260' may be almost negligible. Method 260' allows CPU and DMA operations to be performed in parallel and so may reduce the power consumption of the RAM restore mechanism since the processor or CPU of processor system may be active for other processing tasks during the restore procedure.

Figure 6A:
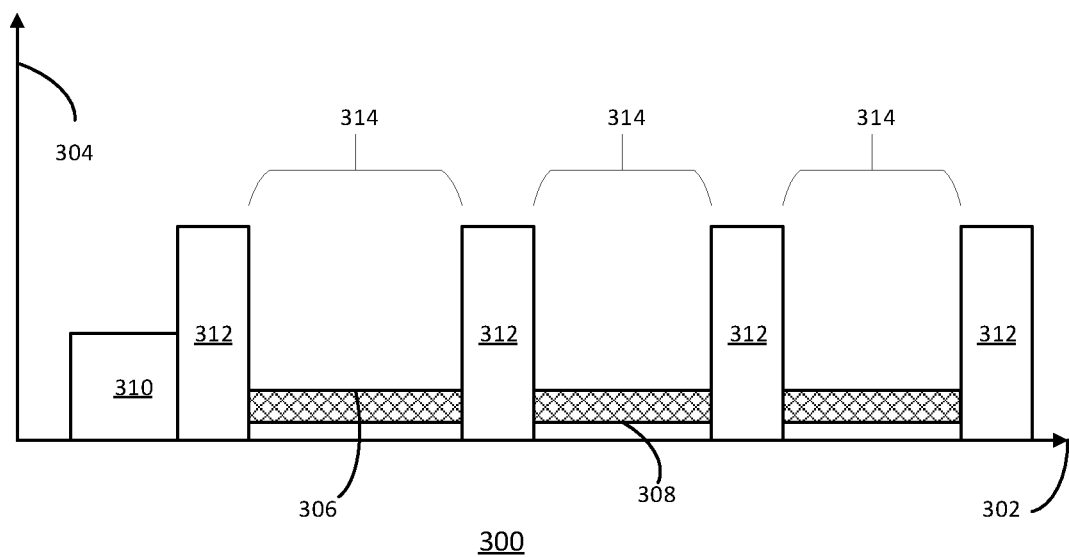
FIG. 6A illustrates the power consumption in different operating modes for a typical processor system configured as an IoT device.

FIG. 6A illustrates a plot 300 of the power consumption on the y-axis 304 versus time on the x-axis 302 in different operating modes for a typical processor system configured as an IoT device. During an initial phase 310 following device power on, the IOT device may execute a full start-up following which the IOT device may be in a phase of normal operation 312. Initial phase 310 and 312 may consume relatively large amounts of power. Following completion of the normal operation of the IOT device which may include activities such as RF advertising if the IOT device is a wireless device, the IOT device may transition to a low power mode during a relatively long time period 314 in which the power consumption may be divided into two elements. First leakage current element 308 may be the power consumption due to current drawn by all of the IOT device excluding the RAM. The second leakage current element 306 may be the current consumption due to the RAM leakage current. The IOT device may then repeatedly transition between the normal phase of operation 312 and the low-power phase of operation 314.

Figure 6B:
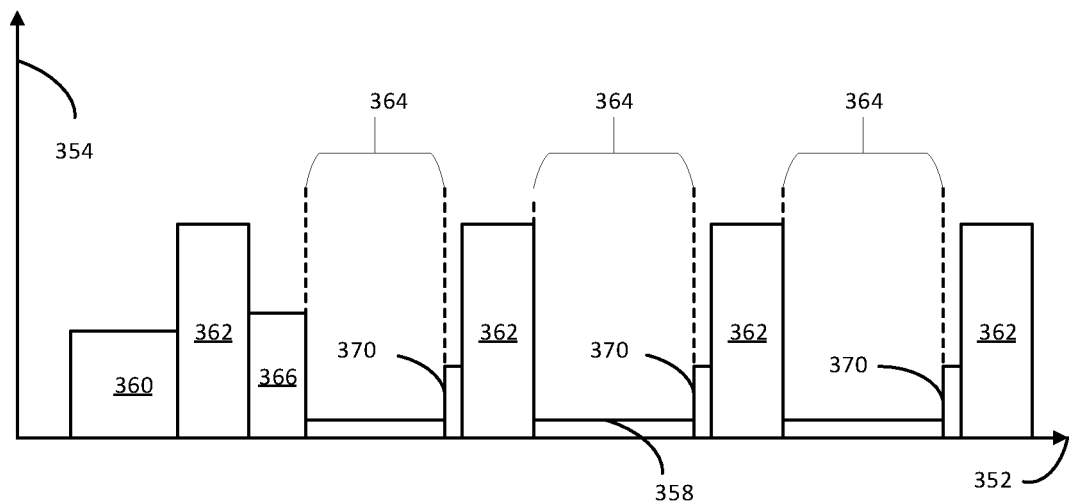
FIG. 6B illustrates the power consumption in different operating modes for a processor system configured as an IoT device according an embodiment.

FIG. 6B illustrates a plot 350 of the power consumption on the y-axis 354 versus time on the x-axis 352 in different operating modes for a processor system according to an embodiment configured as an IoT device. During an initial phase 360 following device power on, the IOT device may execute a full start-up following which the IOT device may be in a phase of normal operation 362. After the first initial phase 362, the IOT device may execute a RAM-image data save operation during a phase 366 using for example method 140 described in FIG. 2B to save the RAM-image data to a non-volatile memory such as a flash memory. The IOT device may then transition to a low power mode during time period 364 in which the RAM is powered off. In this case, the power consumption in the low-power mode may be significantly less than for a typical IoT device since the leakage current 358 does not include leakage current due to the RAM. At the end of the low-power mode phase 366, during restore phase 370, the IoT device may power on the RAM and restore the RAM-image using the methods and apparatus described herein. After subsequent normal operation phases 362, the save operation 366 does not need to be repeated and the IoT device may transition directly from a normal operation mode 362 to a low power mode 364. However each time there is a transition from the low-power mode phase 364 to the normal phase 362, the RAM restore operation 370 may be repeated.

Figure 6C:
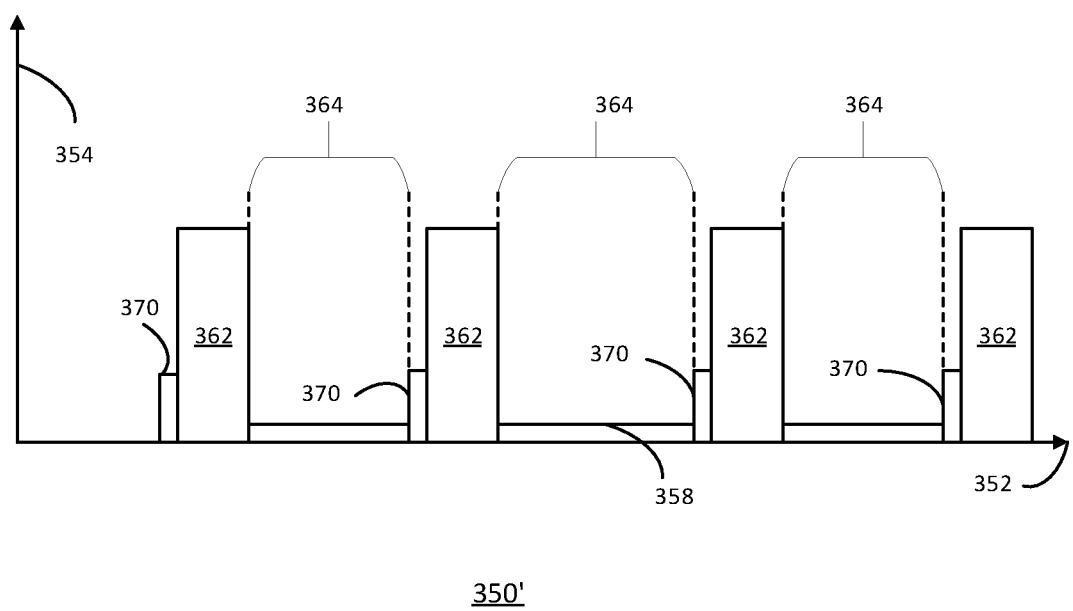
FIG. 6C illustrates the power consumption in different operating modes for a processor system configured as an IoT device according an embodiment.

FIG. 6C illustrates a plot 350' of the power consumption on the y-axis 354 versus time on the x-axis 352 in different operating modes for a processor system configured as an IoT device according to an embodiment. Plot 350' shows an embodiment of an TOT device where the RAM context data is generated off-line and included in the flash memory or other non-volatile memory. In this case the full initial start-up sequence 360 and the RAM save sequence 366 may not be required. The IoT device may transition from a lower power mode phase 364 to a normal mode phase 362 using RAM restore operation 370.

Embodiments of the processor system including a wireless transceiver may be included in IoT devices with wireless transceivers such as Bluetooth low Energy (BLE), Zigbee, Generic Frequency Shift Keying (GenFSK) and Thread technologies that have inactive periods and change to a low power mode. IoT devices or other network node devices may have battery life as one of critical parameters to preserve, and may have a battery life requirement above several years. IoT devices and other network node devices may be configured for example as a tyre pressure monitor system (TPMS), key fobs used for building or car access which may use ultra-wideband radio transceivers, temperature sensors for monitoring temperatures in remote locations or any other sensors for example current sensors.

Embodiments of the processor system may provide a smart mechanism to switch the RAM state to OFF mode, avoiding the RAM leakage in low power mode, without the penalty of increasing the wakeup time from low power mode with the consequent large current consumption. Embodiments of the processor system may reduce the current consumption in low power mode and the current consumption during the wakeup time to transition to a normal operation mode.

The saving of the RAM leakage current consumption in a low power mode may be more important for devices with low transistor size technology where the leakage on the RAM (typically SRAM) are much higher. For network node devices such as IoT devices which may have long periods in low power mode, the power consumption savings may be greater.

A processor system and method is described in the present disclosure. The processor system includes a central processing unit (CPU) comprising a register for storing a stack pointer value, a non-volatile memory coupled to the CPU and having a first non-volatile memory region configured to store instructions executable by the CPU and a second non-volatile memory region configured to store a RAM-image comprising program context data. The processor system includes a random-access memory (RAM) coupled to the CPU and having a first RAM region and a second RAM region. The processor system is configured to have a first operating mode where the RAM data values are not retained and a second operating mode where the RAM is powered on. In operation, the processor system changes from the first operating mode to the second operating mode by: applying power to the RAM, setting the stack pointer value to an address in the second RAM region, copying the program context data from the second non-volatile memory region to the first RAM region, and setting the stack pointer value to an address within a segment of the first RAM region.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

Although the appended claims are directed to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A processor system comprising:
    a central processing unit (CPU) comprising a register for storing a stack pointer value;
    a random-access memory (RAM) coupled to the CPU and having a first RAM region and a second RAM region;
    a non-volatile memory coupled to the CPU and having a first non-volatile memory region configured to store instructions executable by the CPU and a second non-volatile memory region configured to store a RAM-image comprising program context data; and wherein the processor system is configured to have a first operating mode where the RAM data values are not retained and a second operating mode where the RAM is powered on and is further configured to change from the first operating mode to the second operating mode by:
    applying power to the RAM, setting the stack pointer value to an address in the second RAM region, copying the program context data from the second non-volatile memory region to the first RAM region, and setting the stack pointer value to an address within a segment of the first RAM region.

2. The processor system of claim 1 wherein in the first operating mode the RAM is powered off or reset.

3. The processor system of claim 1 wherein the RAM-image further comprises header data and footer data.

4. The processor system of claim 3 further configured to copy the footer data to the first RAM region.

5. The processor system of claim 3 wherein the header data comprises a magic value, a RAM-image size value, a RAM-image start address, and a checksum, and the footer data comprises an end of transfer flag.

6. The processor system of claim 1 further comprising a communication interface coupled to the CPU and wherein the RAM-image further comprises hardware configuration parameters comprising at least one of a CPU register value, a peripheral register value, and a communication parameter value.

7. The processor system of claim 6 wherein the hardware configuration parameters are copied to the RAM before the program context data.

8. The processor system of claim 7 wherein the CPU is configured to update hardware peripherals and transceiver with the hardware configuration parameters while at least part of the program context data is being copied.

9. The processor system of claim 1 further configured to set a stack pointer to an address in the second RAM region, and copy RAM-image data from the first RAM region to the second non-volatile memory region.

10. The processor system of claim 9 further configured to generate the RAM-image by copying hardware configuration parameters comprising at least one of the CPU register values, and hardware peripheral register values to the first RAM region.

11. The processor system of claim 1 wherein the program context data comprises a stack area and a heap area arranged towards opposite ends of the program context data and wherein in the second operating mode the stack and the heap are configured to increase in opposite directions.

12. A method of changing from a first operating mode in which random access memory (RAM) data values are not retained to a second operating mode for a processor system, wherein the processor system comprises a central processing unit (CPU) comprising a stack pointer register, a non-volatile memory coupled to the processor and having a first non-volatile memory region configured to store instructions executable by the CPU and a second non-volatile memory region configured to store a RAM-image comprising program context data, a RAM coupled to the CPU, the RAM having a first RAM region and a second RAM region, the method comprising:
    powering up the RAM, setting the stack pointer value to an address in the second RAM region as the stack, copying the RAM-image from the non-volatile memory second region to the first RAM region, and setting the stack pointer value to an address in a segment of the first RAM region.

13. The method of claim 12 wherein the RAM-image comprises header data and footer data and the method further comprises copying the footer data to the first RAM region.

14. The method of claim 12 wherein the RAM-image further comprises hardware configuration parameters comprising at least one of a processor register value, a peripheral register value, and a transceiver parameter, wherein the method further comprises copying the hardware configuration parameters to the RAM before the processor context data and updating the hardware peripheral registers and transceiver parameters with the hardware configuration parameters while at least part of the program context data is being copied.

15. The method of claim 12 further comprising changing from the second operating mode to the first operating mode by:
using the second RAM region as the stack,
copying the RAM-image from the first RAM region to the non-volatile memory second region.

16. The method of claim 15 further comprising changing from the second operating mode to the first operating mode after copying the RAM-image.

17. The method of claim 12 wherein the RAM-image further comprises hardware configuration parameters comprising at least one of a CPU register value, a peripheral register value, and a communication parameter value and wherein the method further comprises copying the hardware configuration parameters to the RAM before the program context data and at least partially restoring the hardware configuration parameters while the program context data is being copied.

18. The method of claim 12 wherein the program context data comprises a stack area and a heap area arranged towards opposite ends of the program context data and wherein in the second operating mode the stack and the heap are configured to increase in opposite directions.

19. A processor system comprising:
a computer program product;
a central processing unit (CPU) having a register for storing a stack pointer value;
a random-access memory (RAM) coupled to the CPU and having a first RAM region and a second RAM region; and
a non-volatile memory coupled to the CPU and having a first non-volatile memory region configured to store the computer program product and a second non-volatile memory region configured to store a RAM-image comprising program context data;
wherein the computer program product comprises instructions which, when executed by the CPU, cause said CPU to perform the steps of changing the processor system from a first operating mode where RAM data values are not retained to a second operating mode by powering up the RAM, setting the stack pointer value to an address in the second RAM region as the stack, copying the RAM-image from the second non-volatile memory region to the first RAM region, and setting the stack pointer value to an address in a segment of the first RAM region.

20. The processor system of claim 19, wherein the computer program product further comprises instructions which, when executed by the CPU, cause the CPU to perform the steps of setting a stack pointer to an address in the second RAM region, and copying RAM-image data from the first RAM region to the second non-volatile memory region.

* * * * *